United States Patent [19]

Crass et al.

[11] Patent Number: 4,692,837

[45] Date of Patent: Sep. 8, 1987

[54] COEXTRUDED, BIAXIALLY ORIENTED, MULTI-LAYER AND CAPACITOR MADE THEREFROM

[75] Inventors: Guenther Crass, Taunusstein; Lothar Bothe, Mainz-Gonsenheim; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 929,287

[22] Filed: Nov. 12, 1986

[30] Foreign Application Priority Data

Nov. 13, 1985 [DE] Fed. Rep. of Germany ....... 3540214

[51] Int. Cl.$^4$ .......................... H01G 4/04; H01G 4/22
[52] U.S. Cl. .................................... 361/313; 361/315; 361/323
[58] Field of Search .............................. 361/311–319, 361/323, 433

[56] References Cited

U.S. PATENT DOCUMENTS

| | | | |
|---|---|---|---|
| 3,363,156 | 1/1968 | Cox | 361/318 |
| 4,131,931 | 12/1978 | Nishikawa et al. | 361/315 |
| 4,228,481 | 10/1980 | DiNicola et al. | 361/314 |
| 4,283,453 | 8/1981 | Siefried et al. | 428/212 |
| 4,367,511 | 1/1983 | Crass et al. | 361/313 |

*Primary Examiner*—Donald A. Griffin
*Attorney, Agent, or Firm*—Schwartz, Jeffery, Schwaab, Mack, Blumenthal & Evans

[57] ABSTRACT

The multi-layer film comprises a propylene polymer base layer having a stabilizer content of up to 0.2% by weight and outer layers, also composed of propylene polymer, having a stabilizer content of at least 0.3% by weight. The outer layers contain 3 to 10 times the amount of stabilizer present in the base layer, as a result of which the initial value of the dielectric loss factor tan of the multi-layer film is kept low, and the loss factor exhibits only a slight increase with time.

22 Claims, No Drawings

COEXTRUDED, BIAXIALLY ORIENTED, MULTI-LAYER AND CAPACITOR MADE THEREFROM

BACKGROUND OF THE INVENTION

The present invention relates to a coextruded, biaxially oriented, multi-layer film comprising a base layer composed of high-purity electrical insulation plastic film material having a residual ash content of less than 100 ppm.

This multi-layer film is used as a dielectric in impregnated film capacitors comprising multi-layer films of this type and metal foils. These can be either power capacitors or capacitors which are employed in the field of microelectronics.

The use of plastic films as an electrical insulation material has been known for a long time in the state of the art. The films are used both as a dielectric in capacitors and for cable insulation or as supporting films for self-adhesive insulating tapes.

Films of this type must have certain electrical properties, such as, for example, a high resistance to glow discharges, which are formed particularly at points where very small occlusions of gases are present within the laminated structure, composed alternately of metal foils as electrodes and the dielectric. It is possible for these gases to become ionized by the applied electric field and in this state to be able to attack the dielectric film.

In order to avoid glow discharges, the capacitors are flooded with inert gases or impregnated with impregnating fluids. An example of an inert gas used is $SF_6$, which can only be ionized with great difficulty. Impregnating fluids are mineral oils or compounds such as trichlorobiphenyl, diethylhexyl phthalate, vinylsilylethane, benzyl neocaprate or isopropylbiphenyl. Impregnating fluids of this type can also be used for the insulation of high-tension cables. German Offenlegungsschrift No. 2,942,298 describes a film which can be impregnated with impregnating fluids of this type.

Polypropylene films are employed as the dielectric in conjunction with thin metal foils as electrodes in capacitors, particularly at very low capacities, for example, 50 to 10,000 pF. In order to achieve an accuracy of 1 to 3% of the indicated capacitance figure, these capacitors are impregnated with the impregnating agents mentioned above. When capacitors of this type are in operation, oxidation and/or corrosion phenomena, which lead to a marked impairment in the electrical properties of the capacitor, occur at the transition between the dielectric and the metal foil. In particular, an increase in the dielectric loss factor takes place as a function of time.

In order to reduce the oxidation phenomena, and hence the dependence of the dielectric loss factor on time, special stabilizers are added to the plastic film. Although these stabilizers in principle lead to a better time-constancy of the dielectric loss factor, at the same time they increase the starting or initial value of the dielectric loss factor in an unacceptable manner.

European Patent Specification No. 0,011,796 discloses for use as an electrically insulating film a biaxially stretched polypropylene film, which is composed of two layers and is used in a metallized form for the production of capacitors. The raw material for this electrically insulating film is high-purity polypropylene having a residual ash content of less than 100 ppm, free from inorganic or organic slip agents and containing no ionic constituents. This known electrically insulating film is prepared in accordance with one of the known processes by melt-coating or coextrusion and subsequent biaxial stretching.

SUMMARY OF THE INVENTION

It is therefore an object of the present invention to provide an improved coextruded, biaxially oriented, multilayer film comprising a base layer of high-purity propylene polymer in such a way that this film exhibits a low increase with time in the dielectric loss factor when used in a capacitor.

Another object of the invention is to improve said film in such a way that it additionally exhibits a low starting value for the loss factor.

A further object of the invention is to provide an electric film capacitor which shows a low increase with time in the dielectric loss factor and, additionally, a low starting value for the loss factor.

In accomplishing the foregoing objects, there has been provided according to one aspect of the present invention a coextruded, biaxially oriented, multilayer film comprising a base layer and two outer layers on either side of the base layer, with the base layer and the two outer layers including a high-purity electrical insulation plastic film material, having a maximum residual ash content of less than about 100 ppm, and a stabilizer, wherein the ratio of the amount of the stabilizer present in the two outer layers and the amount of the stabilizer present in the base layer lie within the range from about 3:1 to about 10:1.

In accordance with another aspect of the present invention, there has been provided an electric film capacitor comprising at least two films as defined above, and at least two metal layers selected from the group consisting of aluminum, tin and lead/tin alloy, wherein the films and metal layers are contiguous to one another in an alternating relationship.

Further objects, features and advantages of the present invention will become apparent from the detailed description of preferred embodiments which follows.

DETAILED DESCRIPTION OF THE PREFERRED EMBODIMENTS

In accordance with the invention the outside layers of the multi-layer film contain from about 3 to 10 times the amount of stabilizer present in the electrical insulation film material of the base layer.

In a preferred embodiment of the invention, the electrical insulation material and the outside layers comprise propylene polymer, especially polypropylene, and the stabilizers for the propylene polymer are selected from the classes of substances comprising sterically hindered phenols, thioethers, secondary aromatic amines, phosphites, phosphonites or mixtures of these substances.

The base layer preferably contains up to about 0.2% by weight of stabilizer, and each individual outside layer preferably contains at least about 0.3% by weight of stabilizer. The total thickness of the multi-layer film is about 4 to 30 $\mu$m, in particular about 6 to about 20 $\mu$m. The two outside layers are preferably of equal thicknesses, and each has a thickness of 0.3 to about 2.0 $\mu$m, in particular about 0.4 to about 0.8 $\mu$m.

Conventional propylene polymer raw materials for films contain approximately, 0.05 to 0.2% by weight of stabilizer, in particular about 0.1% by weight. On the other hand, the content of stabilizer in each outside layer is about 0.3 to about 1.0% by weight, in particular about 0.3 to 0.5% by weight. If phenolic stabilizers are used, their molecular weight is selected so as to be greater than 300 g/mol, in particular greater than about 1,000 g/mol.

Furthermore, phenolic stabilizers are also employed in combination with stabilizers containing phosphites and phosphonites in a combination ratio of 1:5 to 5:1, in particular about 1:3 to 3:1.

The mutli-layer film is processed in such a way that its surface roughness $R_z$ is less than or equal to about 1.5 μm and is, particularly, within the range of about 0.35 to about 0.08 μm, and the two outside layers have identical or different surface roughness. The surface roughness $R_z$ is determined in accordance to DIN 4768. The polypropylene starting material for the base layer is a high-purity electrical insulation film material which usually has a residual ash content of less than about 50 ppm.

The multi-layer film described above is used as the dielectric in an electric film capacitor which is generally composed of two such multi-layer films and two metal foils composed of aluminum, tin or lead/tin, the latter acting as electrodes and being rolled up together with the multi-layer films to form the capacitor reel.

The multi-layer film which has been prepared by coextrusion, coated on both sides and successively stretched in the longitudinal direction and in the transverse direction contains the propylene polymer base layer and propylene polymer top layers already mentioned. The film has a density greater than about 0.90 g/cm$^3$. The polymer forming the layers is coextruded as a melt through a flat film die. The film obtained by coextrusion is solidified by cooling and is then stretched longitudinally at a temperature of about 120° to 130° C. in the ratio of about 5 to 7:1 and stretched transversely at a temperature of about 160° to 170° C. in a ratio of 8 to 10:1, and finally the biaxially stretched film is heat-set.

Besides high-purity polypropylene, it is also possible to use polymer blends composed of polypropylene and other polyolefins, in particular HDPE, LDPE or poly-4-methyl-1-pentene as the propylene polymer starting materials. It is also possible to employ block copolymers, in particular ethylene and propylene block copolymers. In the copolymers, the amount of comonomer is generally not more than about 10% by weight, relative to the copolymer.

In the case of the outside layers, the propylene polymer used is, as a rule, the same as that used for the base layer. The only difference between the base layer and the outside layers is the particular proportion of stabilizer for the propylene polymer.

A comprehensive classification of stabilizers for polypropylene is provided by T. J. Henman in the publication "World Index of Polyolefin Stabilizers", Kogan Page Ltd., London (1982), from which the following are examples of some preferred stabilizers:

The condensation product formed from acetone, nonylphenol and dilauryl thiodipropionate, 2,6-di-tertiary-butyl-4-methylphenol, 1,3,5-trimethyl-2,4,6-tri(3,5-di-tertiary-butyl-4-hydroxybenzyl)-benzene, tetrakis-methylene-(3,5-di-tertiary-butyl-4-hydroxyhydrocinnamate)-methane, a mixture of 2-ethoxy-5-tertiary-butyl-2'-ethyloxalic acid bisanilide (85–90%) and 2-ethoxy-5-tertiary-butyl-2'-ethyl-4'-tertiary-butyloxalic acid bisanilide (10–15%), tris-(nonylphenyl) phosphite, specifically tris-(mononyl) phosphite, also as a mixture with tris-(dinonylphenyl) phosphite, dioctadecyl disulfide, 1,3,5-tris-(4-tertiary-butyl-3-hydroxy-2,6-dimethylbenzyl)-s-triazine-2,4,6-(1H, 3H, 5H)-trione and bis-[2,2'-methylenebis-(4-methyl-6-tertiary-butylphenol)]terephthalate.

The enumeration of these preferred stabilizers is only exemplary and is not intended to exclude other types of stabilizers.

The following, inter alia, are suitable for use as phenolic stabilizers having a molecular weight greater than about 300 g/mol, in particular greater than about 1,000 g/mol: Octadecyl 3-(3,5-ditert.-butyl-4-hydroxyphenyl)-propionate, pentaerithrityl tetrakis-3-(3,5-ditert.-butyl-4-hydroxyphenyl)-propionate, 1,3,5-tris(3,5-ditert.-butyl-4-hydroxybenzyl) isocyanurate, 1,1,3-tris-(5-tert.-butyl-4-hydroxy-2-methylphenyl)butane, 1,3,5-tris-(3,5-ditert.-butyl-4-hydroxybenzyl)mesitylene, and ethylene glycol bis-[3,3-bis-(3-tert.-butyl-4-hydroxyphenyl)-butyrate].

The use of these phenolic stabilizers in combination with stabilizers containing phosphites and phosphonites is particularly advantageous, the combination ratio of phenolic stabilizers to the stabilizers containing phosphites and phosphonites being within the range from about 1:5 to 5:1, in particular about 1:3 to 3:1. The following stabilizers containing phosphites and phosphonites are preferred for this purpose: tetrakis-(2,4-ditert.-butylphenyl)-4,4'-biphenylylene diphosphonite, distearylpentaerythritol diphosphite, tris-(nonylphenyl) phosphite, tris-(2,4-ditert.-butylphenyl) phosphite, and bis-(2,4-ditert.-butylphenyl)pentaerythritol diphosphite.

The multi-layer films can fall within the following surface roughness ranges (a) smooth films having a surface roughness $R_z$=0.08 to 0.12 μm.

(b) metallization films having a surface roughness $R_z$=0.15 to 0.35 μm and (c) impregnation films having a surface roughness $R_z$=0.5 to 1.5 μm.

The surface roughness values of the two outer layers are generally of equal magnitude, but the outside layers can also have different surface roughness values.

With regard to the multi-layer film, it has, moreover, been found that a particularly good timeconstancy of the dielectric loss factor is achieved when the film surfaces are not subjected to corona treatment.

An example of the multi-layer film according to the invention and two comparison examples are given below, as well as a general review of the substance categories of stabilizers which are suitable for polypropylene.

EXAMPLE

A polypropylene base layer containing 0.1% by weight of stabilizer and having polypropylene outer layers containing 0.5% by weight of stabilizer applied to both sides was coextruded through a flat film die. After the coextruded multi-layer film had been cooled, it was stretched in the longitudinal direction and then in the transverse direction and was finally heat-set. The multi-layer film thus obtained had a total thickness of 8 μm, of which 6 μm constituted the thickness of the base layer and 1 μm constitutes the thickness of each of the individual outer layers. Preliminary corona treatment was not carried out.

The starting value of the dielectric loss factor tan δ is $3 \times 10^{-4}$. The loss factor was measured at a temperature of 130° C. and at a frequency of 100 kHz for the alternating current voltage applied for the measurement. The dielectric loss factor was determined in a well known manner by means of a capacity measuring bridge.

The loss factor also exhibited, incidentally, a slight dependence on the temperature and increased with the latter. The starting value doubled within 5 days, which is a long time period compared with a period of 3 days for doubling the starting value of a known film.

COMPARISON EXAMPLE 1

A standard polypropylene film of thickness 8 μm and containing 0.1% by weight of stabilizer was coextruded through a flat film die. The melt was essentially composed of a polypropylene homopolymer, and the resulting polypropylene film had a density within the range of from 0.905 to 0.910 g/cm$^3$. The starting or initial value of the dielectric loss factor tan when measured at an alternating current voltage of frequency 100 kHz and at 130° C. was $3 \times 10^{-4}$. The starting value doubled within three days, from which it is evident that there is a high time-dependence of the dielectric loss factor in the case of a standard polypropylene film compared with the multi-layer film according to the invention.

COMPARISON EXAMPLE 2

The same standard polypropylene film as in Comparison Example 1 was used, but the proportion of stabilizer was increased to 0.5% by weight. The result of this was that the starting value of the dielectric loss factor tan was $7 \times 10^{-4}$ and was thus more than twice that of the multi-layer film as indicated in the example according to the invention. Such a starting or initial value of the dielectric loss factor is too high for a capacitor reel or for the use of a film of this type as an electrical insulation film. The dielectric loss factor increased to twice this value in the course of 50 days.

In both the example of the multi-layer film according to the invention and in Comparison Examples 1 and 2, a stabilizer combination composed of pentaerythritol tetrakis-(3-(3,5-ditert.-butyl-4-hydroxyphenol)-propionate) and tris-(2,4-ditert.-butylphenyl) phosphite (1:1 ratio) was employed for stabilization.

In the example, the base layer was stabilized as indicated by means of a content of 0.1% by weight of the stabilizer combination mentioned above, whereas each outer layer was stabilized, in each case, by means of a content of 0.5% by weight of the stabilizer combination.

In the case of the single layer films of Comparison Examples 1 and 2, stabilization was effected by means of a content of 0.1% by weight and 0.5% by weight, respectively, of the stabilizer combination.

Stabilizers for polypropylene

The table below provides a review of the substance categories of stabilizers which are suitable for polypropylene.
(a) Thiobisphenols, for example:

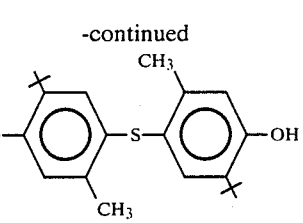

(b) Alkylidenebisphenols, for example:

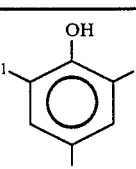

(c) Alkylphenols, for example:

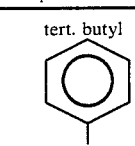

-continued

| | R₁ | R₂ |
|---|---|---|
| 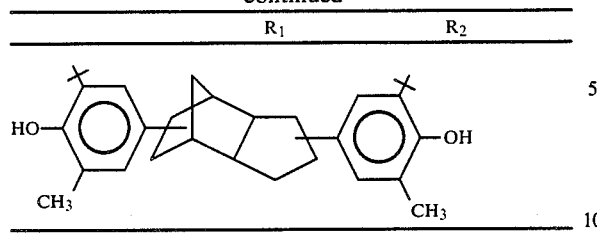 | | |

(d) Hydroxybenzyl compounds, for example:

| A |
|---|
| 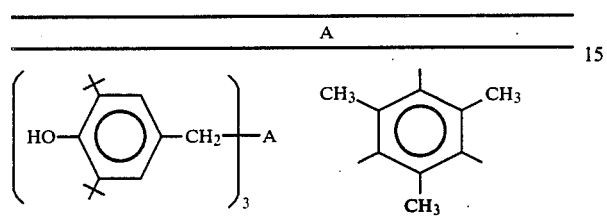 |

| | n | A |
|---|---|---|
| 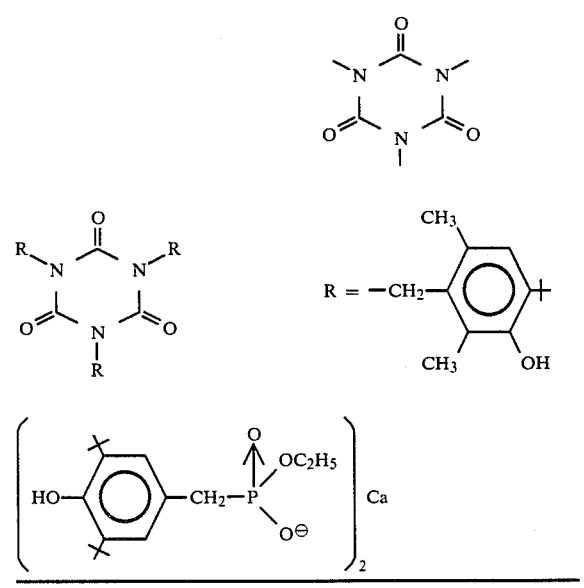 | 1 | —OC₁₈H₃₇ |
| | 2 | —O(CH₂)₆O— |
| | 2 | —NH—(CH₂)₆—NH— |
| | 2 | —O(CH₂)₂—S—(CH₂)₂O—O— |
| | 3 | 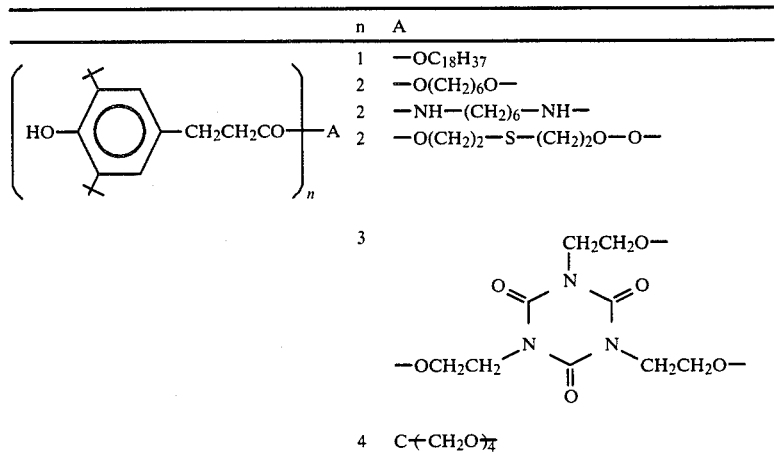 |
| | 4 | C(CH₂O)₄ |

(e) Acylaminophenols, for example:

| | R₁ | R₂ |
|---|---|---|
| 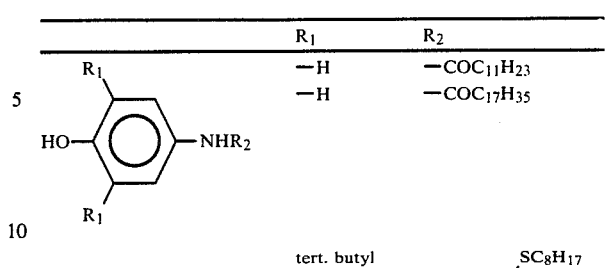 | —H | —COC₁₁H₂₃ |
| | —H | —COC₁₇H₃₅ |
| | tert. butyl | 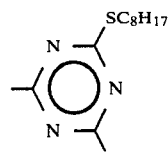 |

(f) Hydroxyphenyl propionates, for example:

(g) Secondary aromatic amines, for example:

| | R |
|---|---|
|  | tert. octyl |
| | 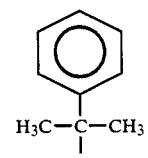 |

(h) Thioethers, for example:

| | R |
|---|---|
| 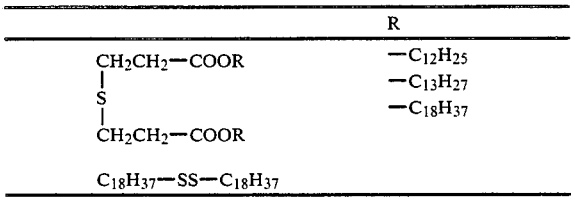 | —C₁₂H₂₅ |
| | —C₁₃H₂₇ |
| | —C₁₈H₃₇ |

(i) Phosphites and phosphonites, for example:

| | $R_1$ | $R_2$ |
|---|---|---|
| $\begin{array}{c}R_1O\\ \diagdown\\ P-OR_2\\ \diagup\\ R_1O\end{array}$ | —Phenyl | —n-Decyl |
| 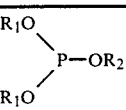 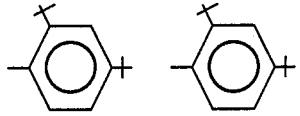 | —Nonylphenyl | —Nonylphenyl |

| | R |
|---|---|
| 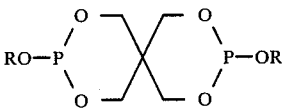 | —$C_{18}H_{37}$ |

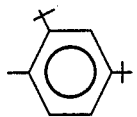

What is claimed is:

1. A coextruded, biaxially oriented, multi-layer film comprising:
   a base layer and
   two outer layers on either side of said base layer, said base layer and said two outer layers including a high-purity electrical insulation plastic film material, having a maximum residual ash content of less than about 100 ppm, and a stabilizer,
wherein the ratio of the amount of said stabilizer present in said two outer layers and the amount of said stabilizer present in said base layer lies within the range from about 3:1 to about 10:1.

2. A film as claimed in claim 1, wherein said electrical insulation plastic film material comprises a propylene polymer.

3. A film as claimed in claim 2, wherein said propylene polymer has a maximum residual ash content of less than about 50 ppm.

4. A film as claimed in claim 1, wherein said stabilizer comprises a sterically hindered phenol, a thioether, a secondary aromatic amine, a phosphite and a phosphonite or a mixture thereof.

5. A film as claimed in claim 4, wherein said stabilizer comprises a sterically hindered phenolic stabilizer having a molecular weight greater than about 300 g/mol.

6. A film as claimed in claim 5, wherein said molecular weight is greater than about 1,000 g/mol.

7. A film as claimed in claim 4, wherein said stabilizer comprises a sterically hinded phenolic stabilizer in combination with a stabilizer comprising a phosphite or a phosphonite, and wherein the ratio of said combination lies within the range of from about 1:5 to about 5:1.

8. A film as claimed in claim 7, wherein said combination ratio is within the range from about 1:3 to about 3:1.

9. A film as claimed in claim 1, wherein said base layer comprises said stabilizer in an amount of up to about 0.2% by weight, calculated on total weight of said base layer.

10. A film as claimed in claim 1, wherein said two outer layers comprise said stabilizer in an amount of at least about 0.3% by weight, calculated on total weight of said two outer layers.

11. A film as claimed in claim 10, wherein said amount of stabilizer is within the range of from about 0.3 to about 1.0% by weight.

12. A film as claimed in claim 11, wherein said amount of stabilizer is within the range from about 0.3 to about 0.5% by weight.

13. A film as claimed in claim 1, having a total thickness of from about 4 to about 30 μm.

14. A film as claimed in claim 13, wherein the total thickness is within the range of from about 6 to about 20 μm.

15. A film as claimed in claim 1, wherein each of said two outer layers has a thickness of from about 0.3 to about 2.0 μm.

16. A film as claimed in claim 15, wherein each of said two outer layers has a thickness of from about 0.4 to about 0.8 μm.

17. A film as claimed in claim 15, wherein said two outer layers are of equal thickness.

18. A film as claimed in claim 15, wherein each of said two outer layers has a maximum surface roughness $R_z$ of up to about 1.5 μm, determined in accordance to DIN 4768.

19. A film as claimed in claim 18, wherein said surface roughness $R_z$ is from about 0.08 to about 0.35 μm.

20. A film as claimed in claim 18, wherein both of said two outer layers have identical surface roughness.

21. A film as claimed in claim 18, wherein the surface roughness of each of said two outer layers is different.

22. An electric film capacitor comprising:
   at least two films as claimed in claim 1, and
   at least two metal layers selected from the group consisting of aluminum, tin and lead/tin alloy, wherein the films and metal layers are contiguous to one another in alternating relationship.

* * * * *